Oct. 10, 1944.       H. F. McLOUGHLIN ET AL       2,360,304
ELECTRIC COUPLING
Filed May 30, 1942          2 Sheets-Sheet 1
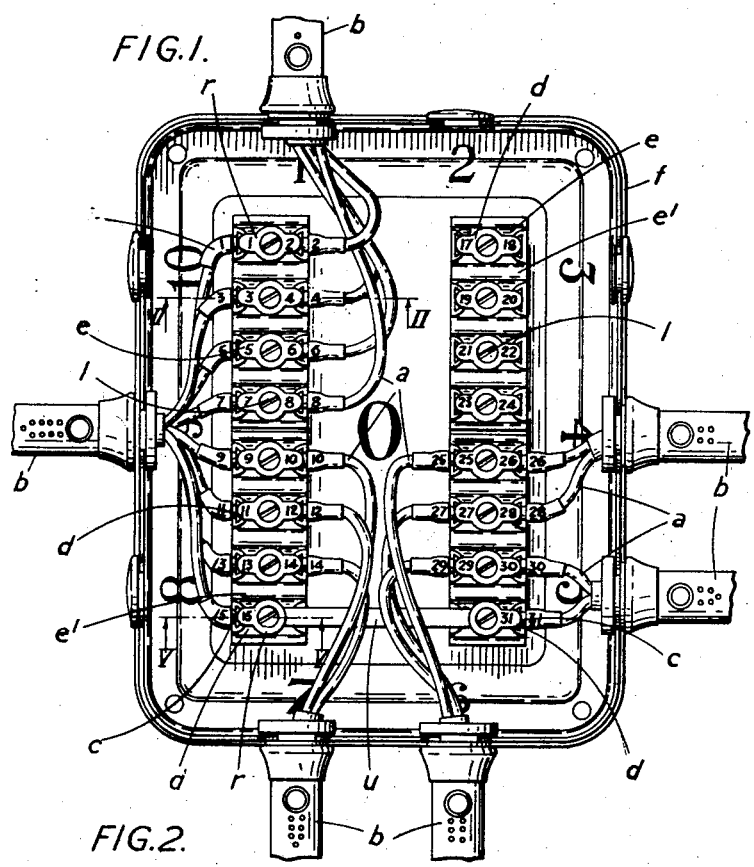
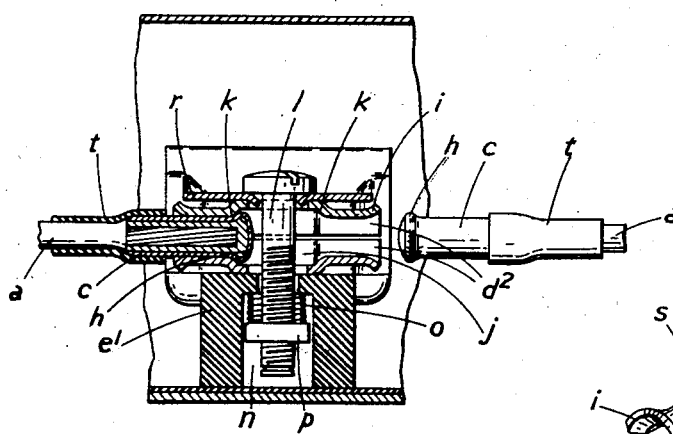
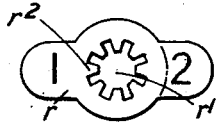
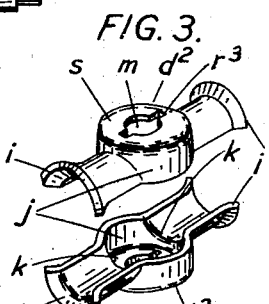
INVENTORS:
Harold F. McLoughlin,
Walter E. Hill, Richard W. Morgan & Thomas O. Whittle,
By Smith, Michael and Gardiner,
ATTORNEYS.

Oct. 10, 1944.  H. F. McLOUGHLIN ET AL  2,360,304
ELECTRIC COUPLING
Filed May 30, 1942   2 Sheets—Sheet 2
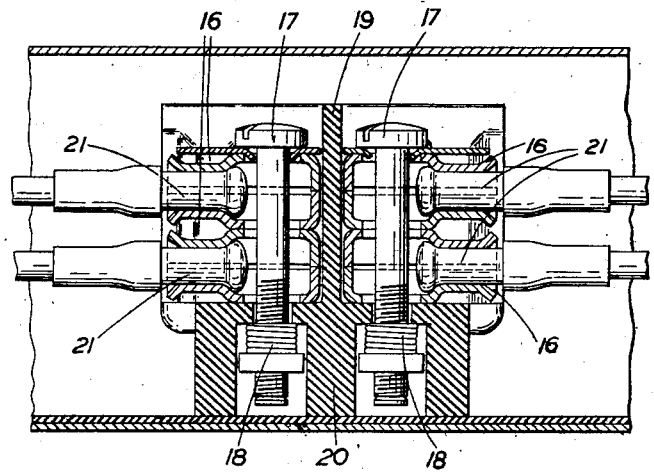
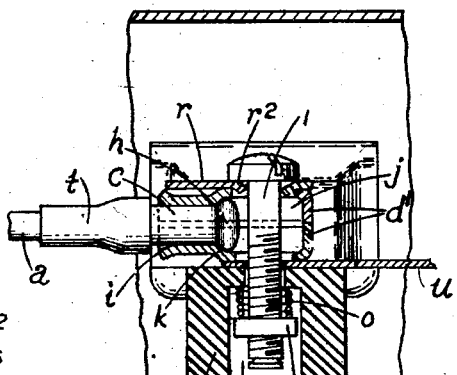
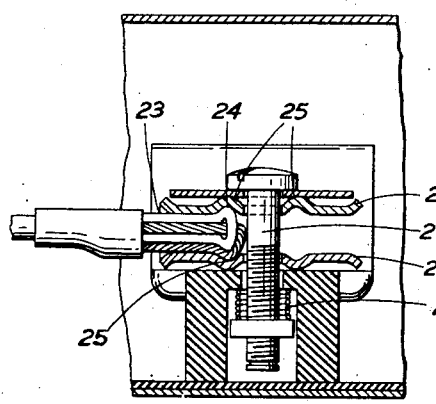
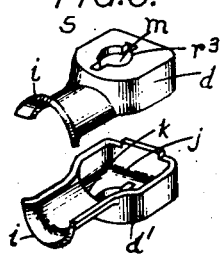

Patented Oct. 10, 1944

2,360,304

UNITED STATES PATENT OFFICE 2,360,304

ELECTRIC COUPLING

Harold Fletcher McLoughlin, Shenstone Court, Shenstone, near Lichfield, Walter Edward Hill, Streetly, and Richard Walter Morgan and Thomas Daniel Guy Wintle, Walsall, England; said McLoughlin assignor to J. A. Crabtree & Co. Limited, Walsall, Stafford County, England Application May 30, 1942, Serial No. 445,233
In Great Britain October 6, 1941

1 Claim. (Cl. 173—259)

This invention relates to improvements in and connected with couplings for electrical wiring systems and is particularly concerned with the construction of couplings for use in the wiring of aircraft in which a large number of connections require to be made at junction boxes, distribution boards and the like situated between a generator and various electrically operated accessories. In the relatively confined space of an aeroplane the electrical wiring usually offers some difficulty and occupies considerable time, while maintenance and replacement of parts may result in the plane being out of commission for an undesirably long period.

The principal object of the present invention is to provide an improved construction of socket adapted for ensuring ease of assemblage and for facilitating maintenance and replacement, while being composed of few parts capable of being economically produced and readily assembled.

A further object is to provide a terminal end or plug for an electrical conductor adapted to co-operate with the socket parts for ensuring its retention therein in the event of inadvertent loosening of such parts.

According to this invention a socket for the reception of a plug or terminal end of a conductor, comprises a pair of resiliently connected clamp members adapted for releasably trapping or locking the plug. The socket members are preferably made from similarly constructed pressings and are retained in enhancing position with a plug by a screw associated with a spring adapted for maintaining clamping engagement in the event of inadvertent turning of the screw. The sockets may be constructed as single entries or as straight through connectors, or they may be associated with clips for holding fuses. The sockets may be mounted in moulded insulating blocks having advantageous creepage characteristics and adapted to enable the employment of the minimum number of different mouldings in the system. Thus only a few moulding tools are required, while the tools necessary for the production of other parts are small and of simple construction. The coupling affords a high degree of mechanical and electrical efficiency while assemblage can be effected with the aid of unskilled labour.

A terminal end or plug for reception in the socket may be formed with an enlargement or recess adapted for engagement with a co-operating formation in the socket. For example a ferrule secured by soldering to the bared end of a conductor may be formed at its closed end with an annular flange or enlargement adapted for abutment against an annular shoulder presented by the socket members. Alternatively, soldering may be dispensed with by the employment of a metal sleeve through which the conductor wires are introduced and over which they are bent back so as to be in direct contact with the socket. The ferrule or sleeve is preferably of circular shape in cross section although a flat member may be provided for use with socket plates of flat formation.

In order to enable the invention to be readily understood reference will now be made to the accompanying drawings illustrating by way of example constructions for carrying the invention into effect for the wiring of aircraft. In the drawings:

Figure 1 is a plan of a connection box with the lid removed.

Figure 2 is a section on the line II—II of Figure 1, the lid being in position and one of the plugs being shown withdrawn from its socket.

Figure 3 is a perspective view of the clamp members of a double-ended socket.

Figure 4 is a plan of an indicator plate for use with the socket shown in Figure 3.

Figure 5 is a section of a two-tier mounting of sockets in an insulating block.

Figure 6 is a section of a socket composed of flat plates.

Figure 7 is a section on the line V—V of Figure 1, of a single-entry socket.

Figure 8 is a perspective view of the clamp members of the socket shown in Figure 7.

Referring to the drawings, the ends of conductors $a$, a number of which are loosely received in a conduit tube or sheath $b$ of flexible and resilient material, such as polyvinyl chloride, are provided with plugs or terminal ends $c$ adapted for individual engagement with socket members $d$ disposed in recesses $e$ of insulating blocks $e^1$, mounted in a connection box $f$ as shown in Figure 1. Each terminal end may be constructed with an annular flange or enlargement $h$ enabling retention of the plug in a complementary socket, as hereinafter described.

In its simplest form as shown in Figures 7 and 8 each socket comprises two similarly constructed pressings $d^1$ adapted to be brought together for embracing the plug or terminal end of a conductor. Each pressing is flared outwardly at $i$ to facilitate the axial introduction of a plug while being chambered or enlarged at $j$ at its closed end. A step $k$ is provided between the plug engaging part of this enlargement, such step constituting a shoulder or abutment for engagement with the annular flange $h$, to prevent withdrawal of the conductor.

In the case of a double-ended socket as shown in Figures 2 and 3 each of the two similar pressings $d^2$ has flared ends $i$ and a chambered portion $j$ between these ends, steps $k$ being provided for engagement with the flanges $h$ of the conductor plugs.

The two parts $d^1d^1$ Figure 8, or $d^2d^2$ Figure 3, of a socket are maintained in clamped locking engagement with a plug by means of a screw $l$, which is passed through openings $m$ in the enlarged or chambered portions $j$, and which extends into a deep recess $n$ in an insulating block $e^1$. A helical compression spring $o$ is coiled around the portion of the screw disposed in this recess and is operative between a square nut $p$ on the end of the screw to bring the socket parts into embracing engagement with a plug. The end of the screw may be riveted over to ensure that the nut is retained thereon. When the head of the screw is turned for bringing the parts into this position, the convolutions of the spring are tightly coiled so as to be solid around the screw. Thus in the event of inadvertent rotation of the latter, the spring expands to take up any slackness and thereby maintain the socket parts in gripping engagement with the plug $e$, while serving also as an anti-vibration means. When it is desired to withdraw the end of a conductor, the screw is turned, whereupon endwise pull on the conductor causes the annular flange $h$ on a plug to press the socket members apart against the action of the spring. Introduction is effected by thrusting the ferrule into the flared mouth of the socket parts snapping into engagement when the flange enters the chambered or enlarged part $j$ of the socket. Turning of the screw to cause the spring to become solid effectively locks the ferrule in position with its flange $h$ abutting against an annular shoulder $k$ of the socket.

A flat indicator plate $r$ is clamped in position upon a flat surface $s$ of the upper socket member by the head of the screw $l$ the stem of which extends through an opening $r^1$ in the plate. The periphery of this opening is formed with small inwardly extending nibs $r^2$ adapted to project into complementary slots $r^3$ extending outwardly from diametrical points of the opening $m$ in the upper socket member, for obtaining non-rotational mounting of the plate. It will be understood that, for a double-entry socket Figures 2 and 3, the plate is formed with an indicator tab at each end, see Figure 4, while for a single-entry socket Figures 7 and 8, the plate is formed with only a single indicator tab.

The plates $r$ and rubber sleeves $t$ around the ends of the conductors are provided with appropriate markings to assist the wireman or operative to obtain correct coupling. The flattened surface $s$ of the lower socket members are adapted to be seated on a bus-bar or connecting link such as $u$ Figure 7, for linking or establishing common connection between various sockets. It is to be understood that the coupling and interconnection of the various sockets as shown in Figures 1 to 8 is merely an example of one system of connections.

The socket Figure 7 affords a single outlet or coupling for a terminal end while the arrangement in Figure 2 provides a straight through connection between two conductors and for double tapping of points from a bus-bar.

For the purpose of enabling the accommodation of an increased number of sockets in a connection or distribution box while maintaining the compactness of the latter, socket clamps 16, may, as shown in Figure 5, be superposed one above the other and secured in position by a single screw 17 and associated spring 18 as previously described. In the example illustrated the open ends of the single entry sockets are directed outwards, the closed ends of the rows being separated by a central partition 19 of the insulating block 20. The sockets of each pair are maintained in electrical contact while being effectively engaged with respective plugs 21.

As shown in Figure 14, a socket member is composed of flat plates 22 adapted for interlocking engagement with a flat terminal end 23 on a conductor. For example, an enlarged end 24 of the terminal or plug may be entered into a transverse groove 25 in the plates for retention of the plug even if the screw 26 should be loosened, the spring 27 acting for maintaining the plates in engagement with the plug as previously described. Alternatively, a protuberance on the plug may enter an opening or recess in a plate, or vice-versa.

We claim:

An electrical coupling comprising a plug on the end of a conductor and having a terminal enlargement, and a socket composed of opposed clamp members embracing said plug and having abutments for engagement with the enlargement on the plug, said clamps having aligned openings therethrough, an insulated base carrying said socket and having an opening therein in alignment with the socket openings and terminating in a recess, a screw freely passing through the openings in the socket and base and operable independently of said opposed clamp members, so as to eliminate rotation of the clamps when the screw is operated, a nut carried non-revolubly on said screw and lying within the base recess, and a spring surrounding said screw and disposed between the nut and a wall of the base recess to urge the clamp members into embracing engagement with the plug, said spring being operable throughout the entire range of screw adjustment to resiliently urge the clamp members toward each other and operable when fully compressed to positively lock the opposed clamps onto the plug.

HAROLD FLETCHER McLOUGHLIN.
WALTER EDWARD HILL.
RICHARD WALTER MORGAN.
THOMAS DANIEL GUY WINTLE.